Sept. 25, 1962 L. D. BALDWIN 3,056,098

MULTIPLE TUNING SYSTEM FOR MICROWAVE TRANSMISSION LINES

Original Filed March 23, 1959 2 Sheets-Sheet 1

*INVENTOR,*
LEROY D. BALDWIN

*BY* [signature]
*his attorneys.*

Sept. 25, 1962 L. D. BALDWIN 3,056,098

MULTIPLE TUNING SYSTEM FOR MICROWAVE TRANSMISSION LINES

Original Filed March 23, 1959 2 Sheets-Sheet 2

INVENTOR,
LEROY D. BALDWIN

BY [signature]

his attorneys.

United States Patent Office 3,056,098

Patented Sept. 25, 1962

3,056,098
MULTIPLE TUNING SYSTEM FOR MICROWAVE TRANSMISSION LINES

Leroy D. Baldwin, Rochester, N.Y., assignor to General Dynamics Corporation, Rochester, N.Y., a corporation of Delaware Continuation of application Ser. No. 801,157, Mar. 23, 1959. This application Feb. 6, 1961, Ser. No. 87,499
6 Claims. (Cl. 334—43)

This application is a continuation of the copending application filed March 23, 1959, Serial No. 801,157, entitled "Multiple Tuning System for Microwave Transmission Lines," now abandoned, and assigned to the assignee of this application.

This invention relates to the tuning of microwave transmission lines such as employed, for example, for connecting antenna sources of microwave energy with loads such as filter elements of receivers or transmitters. Microwave systems commonly include a plurality of transmission lines each having a radio frequency different from those of the other lines, with means for tuning the lines separately and successively.

An object of this invention is to provide a tuning system by which a plurality of lines, operating at the same or different radio frequencies, are tuned simultaneously, rapidly and conveniently by adjustment of a single common control element.

Another object is the provision of a tuning system in which the above improvement is attained by the employment of a single tuning wheel carrying a plurality of tuning stubs extending to variable lengths from contact with printed circuit portions of the transmission lines and movable, in trombone fashion, by the wheel to effect simultaneous tuning of the lines.

A further object is to supply a tuning wheel and stub construction adapted to maintain continuous contact with each of a plurality of printed circuit portions on a line-ground type of printed circuit board, where such circuit portions may vary somewhat in elevation from a planar surface.

Still a further object is to provide a microwave tuning system having the above advantages and embodied in a practical type of construction capable of being readily and economically manufactured and applied.

To these and other ends the invention resides in certain improvements and combinations of parts, all as will be hereinafter more fully described, the novel features being pointed out in the claims at the end of the specification.

Figure 1:
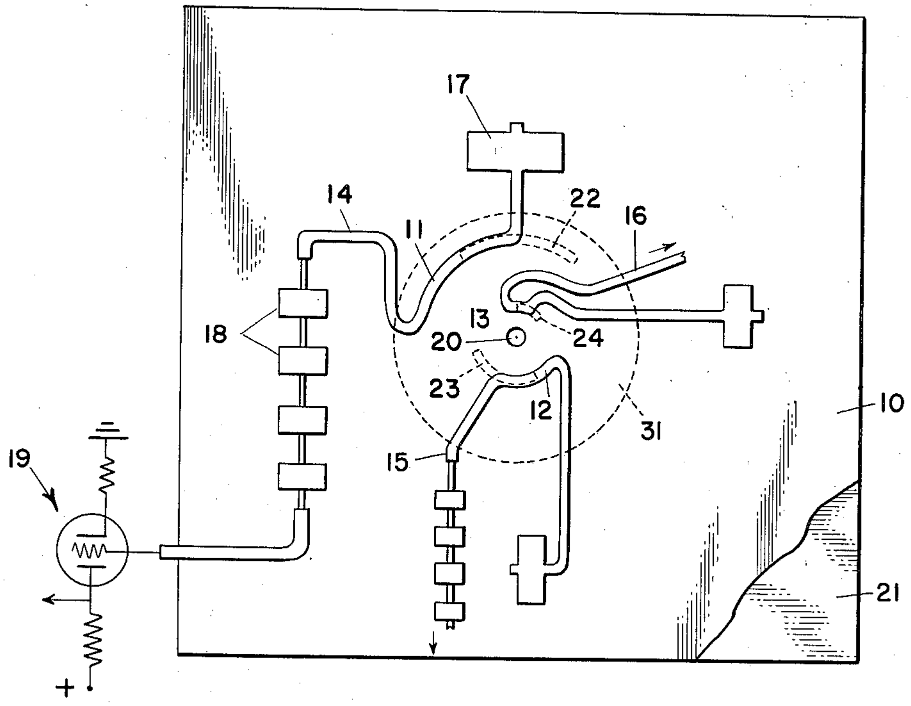
FIG. 1 is a diagrammatic view of circuitry including a plurality of microwave transmission lines each connecting an antenna source of energy with a receiver or transmitter and each provided with adjustable stub means for variably tuning the same.
Figure 4:
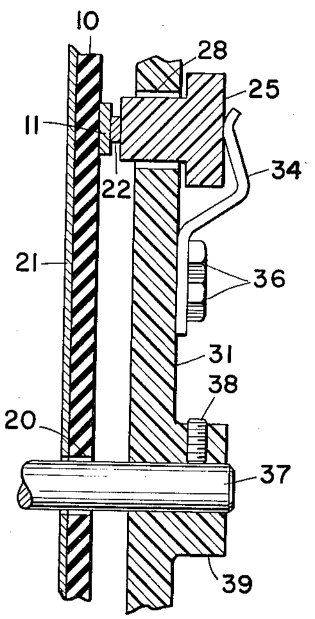
FIG. 4 is a fragmentary, sectional elevation on the line 4—4 in FIG. 3.

The embodiment of the invention, herein disclosed by way of illustration, preferably comprises a planar plate support 10 (FIG. 4) such as a printed circuit board having applied to one face thereof a plurality of printed circuit portions 11, 12 and 13 (FIG. 1) forming part of a plurality of microwave transmission lines, 14, 15, 16. Each transmission line connects an antenna source of microwave energy as 17, with the filter means 18 of a receiver or transmitter 19. The support 10 is composed of high quality, low cost, high dielectric insulation commercially obtainable for use in fields of microwave frequency, such, for example, as polystyrene or polyethylene, or commercially obtainable "Teflon," as well understood in the art.

The printed circuit portions 11, 12, 13, may be applied to the face of plate 10, for example, by "printing" powdered metal ink or paint on the plate; or the face of the plate may be covered with a thin metal sheet or foil of copper or other conductive metal having a thickness of, say, .001 to .003 of an inch, the sheet being covered with a commercial photoresist and exposed through a negative image of the desired line conductor contour, the unexposed portion of the sheet being removed by a metal etching solution, as well understood in the art. It has been found that if the cross-sectional dimensions of the printed line conductors are not materially changed, the characteristic impedance of the conductors remains fairly uniform and unaffected by curves or bends.

Printed circuit portions 11, 12 and 13 are disposed in circular arcs at different distances from a common center 20 to which further reference will be made hereafter, although it may be found desirable in some instances to position the portions 11, 12 and 13 at the same radial distance from the common center 20. These printed portions are shown in the present instance as subtending substantially equal arcuate angles at the center 20, but their respective angles may vary when so desired.

The opposite face of the dielectric plate 10 has applied thereto a coating or layer of copper or other conductive material 21 (FIG. 4), maintained at ground or other suitable equivalent potential relative to that of the transmission lines. While such coating or layer 21 is shown in the present instance as generally covering the face of the support or board 10, it may be in the form of strips disposed opposite the printed circuit portions of the transmission lines in a width at least two or three times that of the corresponding transmission line. The dielectric board 10 has a thickness which is less than a quarter wave length at the mean microwave frequency, the relations being such as to afford an image or mirror reflection of the electric and magnetic fields of the printed circuit portions, these relations insuring the flow of the microwaves in the field between the line and ground conductors, as well understood in the art.

Each transmission line is tuned by means of an arcuate conductor, or stub, of measured length and disposed on a radius about the center 20 to register with and slide in trombone fashion over its printed circuit portion, so that these slidable stubs serve to variably extend the length of the contacting printed circuit portions. The extension of such a stub, one quarter wave length long, for example, has been found to effect reflections which produce a high impedance on the stub at a point where it makes contact with the printed circuit portion of the transmission line, thus serving to tune the line to progressively different microwave frequencies as the length of the extension or projection of the stub from the transmission line is changed. These stubs 22, 23 and 24, shown in broken lines in FIG. 1, cooperate respectively with the printed circuit portions 11, 12 and 13 as the stubs are rotatably adjusted about the center 20 by means hereafter described. While the stubs are shown in the present instance as of substantially the same length as the printed circuit portions with which they contact, it will be understood that the lengths of the stubs and the degree to which they are extended from the printed circuit portions may be varied to suit particular specifications.

Figure 5:
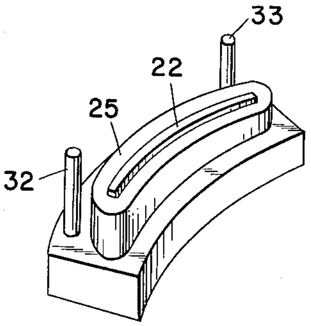
FIG. 5 is a perspective view of a stub tuning strip and a part of the mounting therefor.

The stubs 22, 23 and 24 are preferably copper strips having a thickness of, say, .001 to .003 and a width substantially equal to that of the printed circuit portions 11, 12 and 13 and are applied to arcuate parts or inserts (FIG. 5) slidably supported in recesses or slots in the tuning wheels, as hereafter described. These stubs may be formed from etched printed circuit material having the stub strips left on the inserts, or they can be conductive segments molded in place in the inserts which are of suitable dielectric material corresponding, for example, to that of circular board 10.

Figure 2:
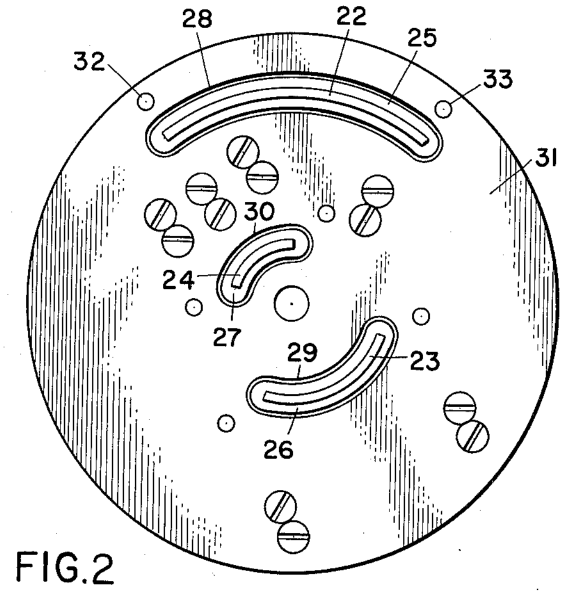
FIG. 2 is a face view of a tuning dial or wheel carrying a plurality of stubs for coaction with said transmission lines, respectively.
Figure 3:
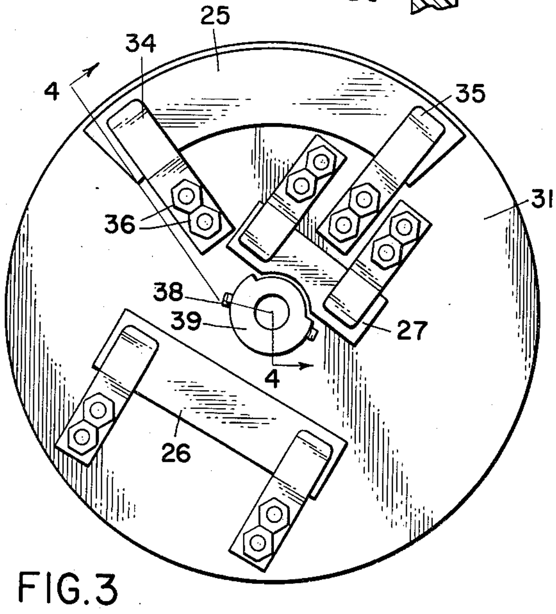
FIG. 3 shows the opposite face of the tuning wheel.

The inserts carrying the stubs 22, 23 and 24 are shown, respectively, at 25, 26 and 27 (FIGS 2 and 4) slidably mounted in corresponding recesses or slots 28, 29 and 30 in a circular disk or wheel 31 of similar dielectric material. Each insert is preferably provided with a pair of dowel-like pins, as at 32 and 33 (FIGS. 2 and 5), sliding in bores in wheel 31 to further guide each insert in its movement toward and from the printed circuit board. Each insert is resiliently urged toward the board by a pair of cantilever type springs, as 34 and 35 (FIGS. 3 and 4) each having one end fixed by screws 36 to the wheel and its other end bearing against an end of the insert, so as to insure continuous contact of its stub with the corresponding printed circuit portion through any variation in elevation of the printed circuit portion, as 11, from the planar surface of board 10.

Wheel 31 is fixedly mounted on a spindle 37 (FIG. 4) and secured by a set screw 38. Spindle 37 extends through board 10 with its axis concentric with center 20 and is rotatably mounted in bearings in supporting structure of any suitable nature (not shown). The wheel may be rotatably adjusted relative to the printed circuit portions by grasping its hub 39 or any suitable knob or other handle portion with which it may be provided.

The planar uniformity of the printed circuit board may be enhanced, if so desired, by replacing the copper layer 21 by a rigid conducting metal plate, maintained at ground potential, as described.

In operation, wheel 10 is turned to concomitantly vary the projection or extension of each stub from its point of contact with the corresponding printed circuit portion. As stated, the positions and lengths of the printed circuit portions 11, 12 and 13 and of the stubs 22, 23 and 24 may be designed to best suit particular specifications. Where the transmission lines are operated at different microwave frequencies, the lines of higher frequencies may be disposed at a less radial distance from the center 20, with printed circuit portions and stubs of lesser length. As the wheel 31 is turned, its stubs engage simultaneously with the ends of the corresponding printed circuit portions and the rotary position of the wheel is adjusted to vary the stub extensions of the printed circuit portions until the transmission lines are thus simultaneously and quickly brought to suitably tuned condition. The invention is embodied in a construction having parts which are readily and economically manufactured and assembled, as apparent from the above description.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. In a microwave multiple tuning system, a plurality of microwave sources of different frequencies, a plurality of loads therefor, a support, a plurality of continuous transmission lines connecting said sources and loads, respectively, said transmission lines including arcuate printed circuit portions positioned on said support about and concentric with a common center, said arcuate printed portions being of different radial distances from said center, and a wheel supported for rotary adjustment about said center and provided with a plurality of arcuate stubs concentric with said center and positioned for sliding contact simultaneously with said arcuate printed circuit portions, respectively, for simultaneously extending beyond one end of each arcuate portion for stub tuning said transmission lines.

2. A microwave multiple tuning system as specified in claim 1 wherein said printed circuit portions are applied to one side of a planar dielectric plate support having parallel sides and a thickness less than a quarter wavelength at the mean microwave frequency and a ground conductor applied to the opposite side of said support and having a width not less than two to three times the width of the opposed printed circuit portions to afford mirror reflection of the fields of said printed portions.

3. A microwave multiple tuning system as specified in claim 1 in which said wheel is a disk of dielectric material formed with a plurality of recesses and said stubs are strips of conductive material formed on inserts of dielectric material slidably positioned and guided in said recesses for movement toward and from said printed circuit portions, respectively, said inserts being provided with resilient means independently urging the same toward said support for continuous contact with the respective stubs.

4. A microwave multiple tuning system as specified in claim 3 further comprising cooperating pin and socket means on said inserts and wheel for guiding the movement of said inserts.

5. In a microwave multiple tuning system, a plurality of microwave sources of different frequencies, a plurality of loads therefor, a support, a plurality of continuous transmission lines connecting said sources and loads, respectively, said transmission lines including arcuate printed circuit portions positioned on said support about and concentric with a common center, said arcuate printed portions being of different radial distances from said center, the arcuate portions of transmission lines of the higher operating frequencies being disposed at less radial distances from said center, and a member supported for rotary adjustment about said center and provided with a plurality of arcuate stubs concentric with said center and positioned for sliding contact simultaneously with said arcuate printed circuit portions, respectively, for simultaneously extending beyond one end of each arcuate portion for stub tuning said transmission lines.

6. In a microwave multiple tuning system, a plurality of microwave sources of different frequencies, a plurality of loads therefor, a support, a plurality of continuous transmission lines connecting said sources and loads, respectively, said transmission lines including arcuate printed circuit portions positioned on said support about and concentric with a common center, said arcuate printed portions being of different radial distances from said center, said radial distances of the arcuate portions of the transmission lines from said center being related to the operating frequencies of said lines and the length of said arcuate portions subtending substantially equal arcuate angles at said center, and a member supported for rotary adjustment about said center and provided with a plurality of arcuate stubs concentric with said center and positioned for sliding contact simultaneously with said arcuate printed circuit portions, respectively, for simultaneously extending beyond one end of each arcuate portion for stub tuning said transmission lines.

References Cited in the file of this patent

UNITED STATES PATENTS 2,832,892 Slate ---------------- Apr. 29, 1958

OTHER REFERENCES

"Handbook of Tri-Plate Microwave Components," Sanders Associates, Inc., Nashua, N.H., 1956, pp. 57–61.